(12) United States Patent
Howson

(10) Patent No.: US 8,046,761 B2
(45) Date of Patent: Oct. 25, 2011

(54) SCALABLE MULTI-THREADED MEDIA PROCESSING ARCHITECTURE

(75) Inventor: John Howson, St. Albans (GB)

(73) Assignee: Imagination Technologies Limited, Hertfordshire (GB)

( * ) Notice: Subject to any disclaimer, the term of this patent is extended or adjusted under 35 U.S.C. 154(b) by 1334 days.

(21) Appl. No.: 11/527,325

(22) Filed: Sep. 26, 2006

(65) Prior Publication Data

US 2007/0101013 A1    May 3, 2007

(30) Foreign Application Priority Data

Sep. 26, 2005    (GB) .................................. 0519597.9

(51) Int. Cl.
  *G06F 9/46*    (2006.01)
  *G06F 9/00*    (2006.01)
(52) U.S. Cl. ........................................ 718/102; 712/225
(58) Field of Classification Search .................. 718/102; 712/225
  See application file for complete search history.

(56) References Cited

U.S. PATENT DOCUMENTS

| | | | | |
|---|---|---|---|---|
| 5,339,413 | A | * | 8/1994 | Koval et al. .................... 719/314 |
| 5,412,788 | A | | 5/1995 | Collins et al. |
| 5,517,631 | A | | 5/1996 | Machado et al. |
| 5,860,018 | A | * | 1/1999 | Panwar ............................ 712/23 |
| 5,968,167 | A | * | 10/1999 | Whittaker et al. ............. 712/225 |
| 6,359,623 | B1 | | 3/2002 | Larson |
| 6,415,340 | B1 | | 7/2002 | Ryan et al. |
| 6,418,458 | B1 | | 7/2002 | Maresco |
| 6,523,098 | B1 | | 2/2003 | Anderson |
| 6,675,190 | B1 | * | 1/2004 | Schabernack et al. ........ 718/102 |
| 6,728,862 | B1 | | 4/2004 | Wilson et al. |
| 6,940,514 | B1 | | 9/2005 | Wasserman et al. |
| 6,948,050 | B1 | | 9/2005 | Gove et al. |
| 7,080,377 | B2 | * | 7/2006 | Peled et al. ................... 718/102 |
| 2002/0087840 | A1 | | 7/2002 | Kottapalli et al. |
| 2005/0021930 | A1 | | 1/2005 | Huang et al. |
| 2005/0021931 | A1 | | 1/2005 | Anderson et al. |
| 2005/0081195 | A1 | * | 4/2005 | Chaudhry et al. ............ 717/154 |
| 2006/0179280 | A1 | | 8/2006 | Jensen et al. |
| 2006/0190703 | A1 | | 8/2006 | Carrie |

FOREIGN PATENT DOCUMENTS

| | | |
|---|---|---|
| EP | 0 697 654 | 2/1996 |
| EP | 0725367 A1 * | 7/1996 |
| EP | 0843 262 A2 | 5/1998 |
| EP | 0 862 113 A2 | 9/1998 |

(Continued)

OTHER PUBLICATIONS

United Kingdom Search Report dated Jan. 26, 2006 (1 page).

(Continued)

*Primary Examiner* — Jennifer To
*Assistant Examiner* — Brian Chew
(74) *Attorney, Agent, or Firm* — Flynn, Thiel, Boutell & Tanis, P.C.

(57) ABSTRACT

A method and apparatus are provided for processing multiple streams of data on a plurality of execution threads. Data is selected from a plurality of data sources. An address in the data storage device is allocated for the selected data which is loaded into the allocated address. An execution task including the selected data source, the data address and an execution address is constructed and the data task is queued with previously constructed tasks. A determination is made as to which processing resources are required for each task and tasks are selected for execution in dependence on the determination. Tasks selected for execution are distributed across a plurality of processing threads.

41 Claims, 6 Drawing Sheets

FOREIGN PATENT DOCUMENTS

| | | | |
|---|---|---|---|
| EP | 1 696 317 | A2 | 8/2006 |
| GB | 2311882 | A * | 8/1997 |
| GB | 2 372 349 | | 8/2002 |
| WO | WO 97/38372 | | 10/1997 |
| WO | WO 99/19805 | A1 | 4/1999 |
| WO | WO 00/33186 | | 6/2000 |
| WO | WO 01/90915 | A2 | 11/2001 |
| WO | WO02/067116 | A3 | 8/2002 |
| WO | WO2006/083543 | A3 | 8/2006 |

OTHER PUBLICATIONS

Proceedings of the Fourth International Conference on Application to Concurrency to System Design, W.M. Zuberek, "Enhanced Interleaved Multithreaded Multiprocessors and Their Performance Analysis" (0-7695-2077-4/2004).

2004 International Conference on Dependable Systems and Networks, N. Nakka and Z. Kalbarczyk, "An Architectural Framework for Providing Reliability and Security Support" (10 sheets).

U.K. Search Report dated Dec. 21, 2006 (1 sheet).

United Kingdom Patent Office Search Report dated Nov. 30, 2007 (6 pages).

"Enhanced Interleaved Multithreaded Multiprocessors and Their Performance Analysis", by Zuberek, Institution of Electrical Engineers, GB, 2004.

"Performance Analysis of Enhanced Fine-Grain Multithreaded Distributed-Memory Systems", by Zuberek, IEEE International Conference on Systems Man and Cybernetics, USA, Oct. 2001, pp. 1101-1106.

"Implicitly-multithreaded Processors", by Park et al, Proceedings of the $30^{th}$ Annual Int'l Symposium on Computer Architecture (ISCA '03), USA, Jun. 2003.

* cited by examiner

SCALABLE MULTI-THREADED MEDIA PROCESSING ARCHITECTURE

This invention relates to a system capable of processing multi-media data such video and 3-dimensional computer graphics and in particular to methods of processing multiple parallel streams of such data within a scalable multi-threaded environment.

BACKGROUND OF INVENTION

International patent application number WO97/38372 (the contents of which are incorporated herein by reference) describes a system for processing multiple real time data sources through a multi-threaded media processing core. The processing core handles a number of execution of instructions. A determination is made as to which thread has the highest priority for execution and execution is formed on that thread in accordance with this.

International patent application number WO02/06716 entitled to control a priority lead structure on a multi-threaded processor (the contents of which are incorporated herein by reference) elaborates further on the arbitration schemes which are possible between different executing threads. It provides a method apparatus for controlling execution rates for instruction threads. The rate at which instructions are to be executed is stored and requests are issued to cause instruction to execute in response to the stored rate. The stored rate is reduced in response to execution of instructions and increased in the absence of instructions for execution. Furthermore, instruction rate is controlled by storing the average rate at which each thread should execute instructions. A value representing the number of instructions available not yet issued is monitored and decreased in response to instruction execution. Also, a ranking order can be assigned to a plurality of instruction threads using a plurality of metrics relating to the threads.

In a further development, a technique known as 'Enhanced interleaved multi-threading' works by maintaining a superset of execution threads from which a subset is maintained a active. The number of active threads is determined by the latency of the execution unit to which they are issuing instructions. Threads are then swapped between the active subset and the superset based on resource dependencies, i.e., if an active thread is waiting or the data to be returned in memory it will be swapped for a currently inactive one that is ready to proceed.

SUMMARY OF THE INVENTION

Preferred embodiments of the present invention provide a system which enables a muti-threaded processing pipeline to be used to processes multiple input data streams that represent bulk non real time data sources in a manner that maximises latency absorption and utilization of pipeline processing resource by using a multi-phased approach to scheduling.

This is performed by using a three phase scheduling system which differentiates the management of data storage within the promising pipeline from the allocation of proceed to within the same pipeline and the scheduling of instructions based on execution resource conflicts.

In accordance with an embodiment of a first aspect of the invention there is provided a method for processing multiple streams of data on a plurality of execution threads comprising the steps of selecting data from at least one of a plurality of data sources in dependence on the availability of storage in a data storage means, allocating an address in the data storage means for the data thus selected, loading selected data at the data address thus allocated, constructing an execution task comprising the selected data source, the data address, and an execution address, queuing the task with other previously constructed tasks, determining which processing resources are required for each task, selecting tasks for execution in dependence on the processing resources available, distributing tasks selected for execution across a plurality of processing threads, determining whether any of the threads will stall because of data dependencies, repeatedly selecting a subset of threads to be active that will not stall due to said data dependencies, and, extecutng active threads.

Preferably an embodiment includes a means for scheduling tasks based on available resource.

Preferably an embodiment includes a means for avoiding prolonged blocking in a data source.

Preferably an embodiment includes a method for loading data into a unified storage area by way of a programmable data sequencer.

Preferably an embodiment may be modified such that the programmable data sequencer is provided on a data processing thread.

Preferably an embodiment provides a method for ensuring data is processed in the correct order.

Preferably the method may be embodied in a tile based rendering system.

Preferably the programmable data sequencer is used for texture coordinate iteration and texture fetches through the system.

Preferably embodiments of the invention are scalable by the different multi processors cores (wherein each multi processor core is matched to a different sector of a tile, the tile size may be adjusted based on the number of attached pipelines, the vertex data is distributed evenly across the pipelines using a pre-scheduling block, and a vent processor is distributed evenly across the pipelines also by a pre-scheduling block).

In accordance with an embodiment of a further aspect of the invention there is provided, a method for allocating data storage in a multithreaded data processing system comprising the steps of selecting data from one of a plurality of data so sources in dependence on the availability of data storage, supplying a code execution address to a programmable data sequencer, executing code from the code execution address to cause data to be written to the data storage means.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENT

Figure 1:
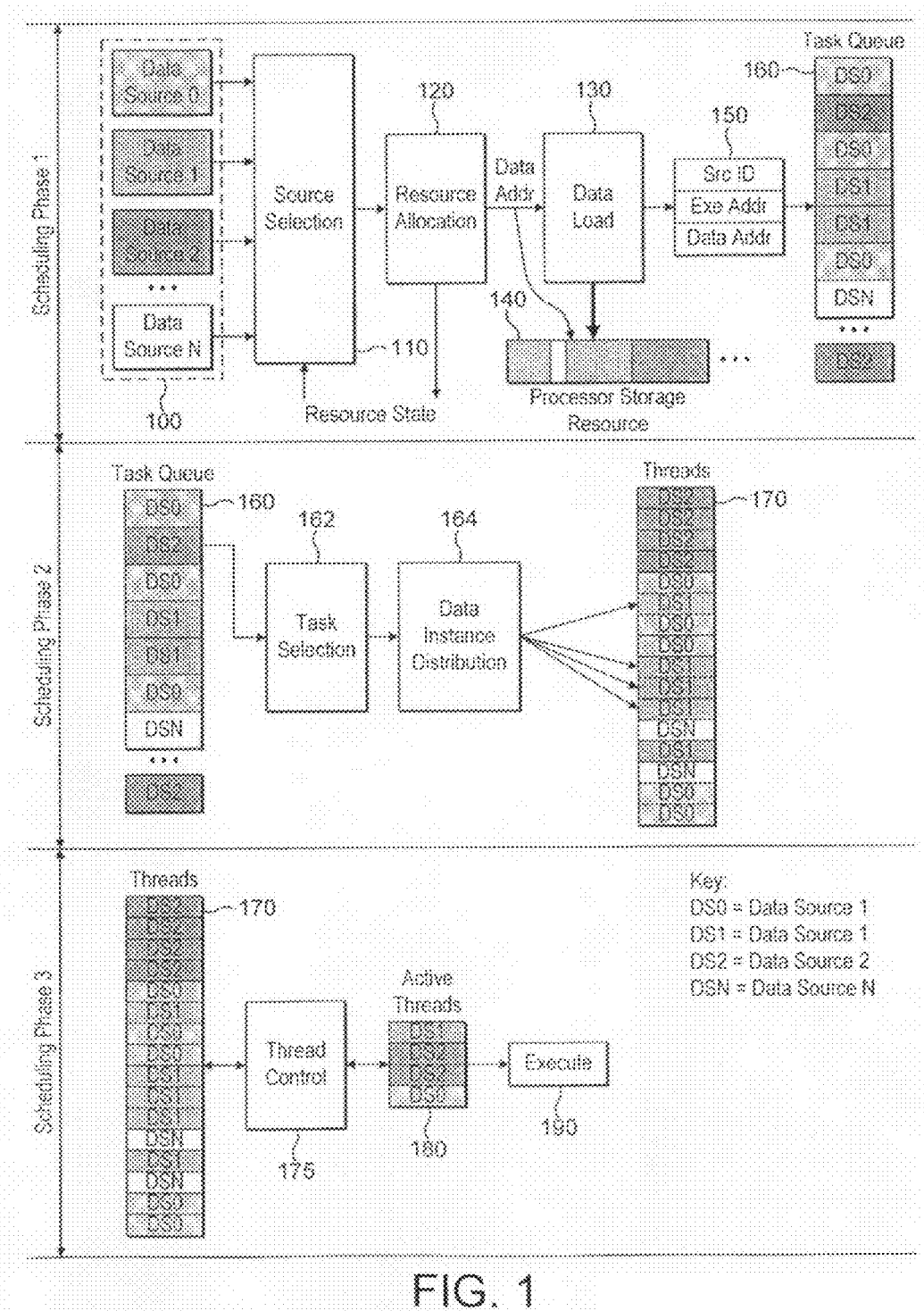
FIG. 1—illustrates the proposed scheduling phases of an embodiment of the invention discussed above.

FIG. 1 illustrates the scheduling phases with the system. The first phase starts with data source selection at 110 of an input from available sources 100 on the basis of there being sufficient resource available in the Processor Storage Resource 140. Allocation of the Processor Storage Resource is then performed at 120 yielding a Data Address within the storage. This address is then used at 130 to load data required for the servicing of the selected source. A task is then constructed at 150 which is composed of (but not limited to) the originating data source ID, an execution address supplied by the data source 100 and the data address. The generated task is then inserted into a task queue 160.

The second scheduling phase involves each task within the queue generated by the first phase being distributed across one or more processing threads within a multi-threaded processing pipeline based on the availability of processing resource within that pipeline. The processing resources required to execute any given task are used to dictate which task within the task queue may be run at 162, specifically the required number of processing threads and temporary storage required to execute those threads. The selected task is to distributed across execution threads 170 at 164.

The third and final execution phase determines which threads may be run at 175 without incurring a stall due to resources that are not currently available e.g. data returned by an external memory read or branch condition that is not currently valid. This is done in a manner that combines the simple resource checking described in patent WO 907/38372 and the technique of "Enchanced interleaved multi-thread". This results in a maintained set of active 180, the number of which is tied to the execution latency of "Execute" 190 (typically an ALU). It should be noted that the third phase executes threads to completion at which point both the threads and any allocated memory resource are returned to the system.

Figure 2:
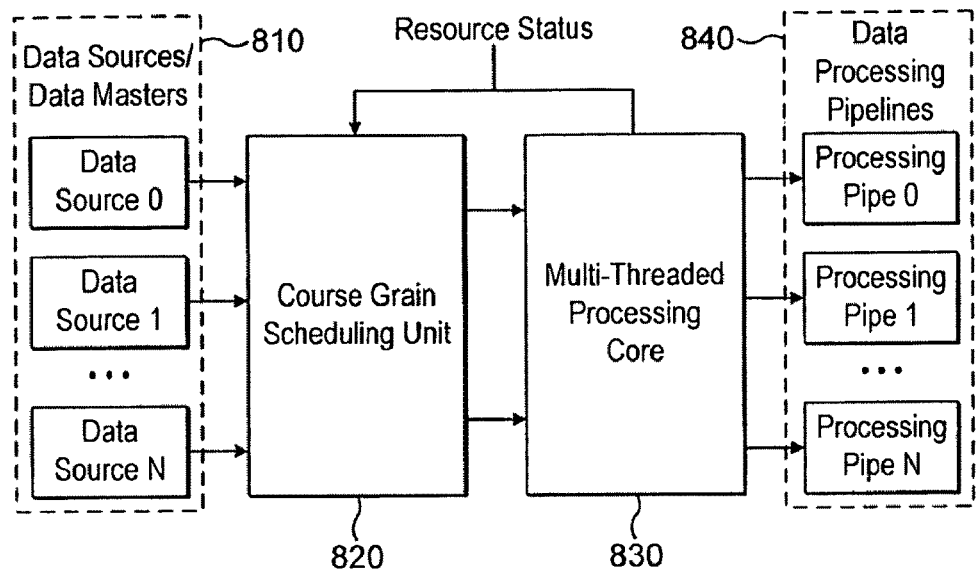
FIG. 2—illustrates the Improved Multi-Media Processing Architecture embodying the invention.

FIG. 2 illustrates the proposed processing architecture to implement FIG. 1 at a high level. The data sources 810 will from now on be referred as "Data Masters " on the basis that they are responsible for instigating all processing within the system. A Coarse Grain Scheduler (CGS) 820 coupled to the data masters undertakes the activities described above within scheduling phase one. The CGS passes tasks to a Muli-Threaded Media Processor (MTMP) 830 which implements scheduling phases two and three described above. Processed data is "emitted" from the MTMP to the data processing pipelines 840. This system differs to that described in International patent no. WO97/38372 by the addition of the CGS and the internal differences within the MTMP associated with the 3 phased scheduling scheme.

Figure 3:
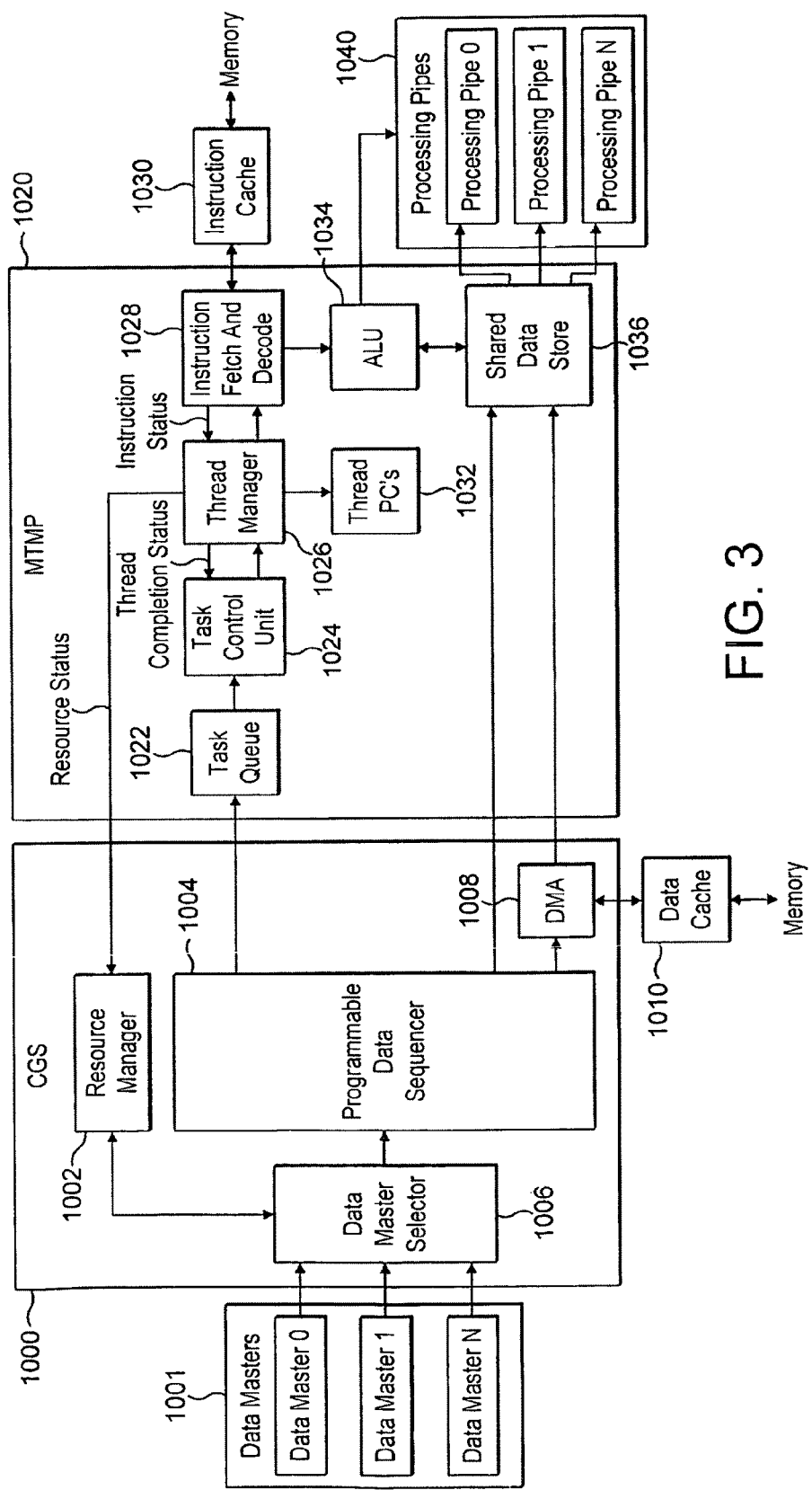
FIG. 3—detailed diagram of architecture of FIG. 2.

FIG. 3 illustrates the details of the basic system in greater detail. The data masters 1001 issue data service requests to a Data Master Selection unit (DMS) 1006 in the CGS 1000. These data requests are in the form of a count of data instances plus the size of an individual data instance. A data instance is defined as a unique quanta of data that may be processed without reference to other data in any of the data sources and without reference to any other data within the incoming data stream, and as such may be processed in parallel with all other data instances supplied by this or any other data master.

The DMS cycles through the data masters looking for one that may be serviced within the resources that are currently indicated as free by a Resource Manager 1002 as described in scheduling phase 1 above. When selecting a data master the DMS also takes into account a minimum data instance count (Referred to as the Data Master Minimum Service Count) that is indicated by the data masters. There must be sufficient resources available to service a multiple of the minimum data instance count stipulated. Once a data master has been selected the DMS allocates the required resources updating the Resource manager as appropriate before passing the selected data master's request onto a Programmable Data Sequencer (PDS) 1004. It should be noted that the resource allocation is in the form of input and output data storage within the MTMP's shared data store 1036.

Input buffer storage is allocated on a per service request basis, however output buffer storage needs additional management in certain circumstances. Specifically certain data types require output buffering to be persistent across multiple service requests (e.g. pixel data), in these cases the output buffering is managed in terms of "macro" tasks. A macro task being defined as a group of task over which output buffering must be persistent. To handle this the DMS/resource manager allocates output buffer storage only on the first task for a data master where there is no output buffer storage currently allocated. This allocation then remains persistent until the data master signals that the macro task is complete, where it may be freed.

It will be noted that it is possible for a data master that requires a large amount of resource for its minimum serviceable quanta to be blocked from processing. This is prevented by the DMS maintaining a timeout counter for each data master. This timeout counter is incremented each time it has a service request rejected, when this counter reaches a predetermined value the data master concerned will be serviced irrespective of currently available resources i.e. the DMS will be prevented from processing until sufficient resources are available. In addition a software control is made available to control and disable/enable the servicing of each data master. This software control can be used to manipulate the amount of processing time available to each data master.

The PDS is a fully programmable processor that is supplied with a code execution address by a data master selected by the DMS. The indicated code is executed once for each data instance that is being serviced from the data master. The code may use data supplied by the data master to generate data directly into the shared data store 1036 or to fetch data from memory via a DMA unit 1008 into the shared data store 1036. It should be noted that the PDS could be implemented as a thread within the MTMP. However this would then take processing resource from other activities.

Once all data instances from a selected data master have been serviced by the PDS a task is issued to the MTMP's task queue 1022. The execution address for the task is preferably supplied directly from the code executed within the PDS. Thus the PDS operation is equivalent to the "Data Load" step 130 from FIG. 1.

The task queue is scanned by a Task Control Unit (TCU) 1024 for tasks that can be issued to a Thread Manager 1026, this is any task that, has no outstanding execution dependencies, whose temporary storage allocation and number of execution threads for the specified minimum number of data instances (same number as Data Master Minimum Service Count) OR whose age has reached or exceeded the maximum allowable Execution dependencies are used to block the execution of a task while there is some external or internal activity that must complete before the task can be allowed to proceed. Examples of such depending are (but not limited to an "external" dependency or a "sequential" dependency.

An external dependency is a condition which is sourced from a piece of hardware external to the MTMP which blocks the task's execution until the condition is released. For example a task may require one of the processing pipelines 1040 to complete before proceeding.

A sequential dependency is applied where a task may update an output buffer register that is also updated on a task that preceded its arrival in the queue. When the task manager sees a task with a sequential dependency set it will allow all tasks from the same data master in the queue that were supplied before it to complete before allowing it to proceed. It should be noted that only tasks from the same data master are blocked in these circumstances, this is why the data master/source ID is included within the task data. In a further modification to this mechanism a task could carry a mask of output registers that are modified, the sequential dependency then being applied selectively only where those masks overlap.

In order to prevent a task with large resource requirements from being blocked for long periods of time each task in the queue has an "Age" counter which is incremented each time a task is rejected for processing by the TCU. When the age counter reaches a defined limit a task that has no outstanding execution dependencies will be selected for processing irrespective of available thread and temporary storage availability.

Once a task has been selected for service its data instances are distributed to threads as they and the required temporary register resources become available as shown schematically in the scheduling phase 2 in FIG. 1. Temporary register storage is also allocated from the shared data more 1036 with the store being pre divided in a fixed manner between input, output end temporary storage areas which are then managed independently. It should be noted that input and temporary storage be combined into a single partition and both allocated in phase 1 of the scheduling, however this has the disadvantage of reserving temporary storage for longer than necessary.

The Thread Manager 1026 performs the actions to implement scheduling phase 3 as shown in FIG. 1. The thread manager maintains a number of simultaneous execution threads of which a subset are active at any given time. Execution of code for the active threads is by round robin e.g. if there are two active threads within the system instruction fetches are issued for thread 0, threat 1, thread 0, thread 1 etc. As ALU pipelines do not typically produce a result in the same clock cycle a issuing an operation down the pipeline instructions referencing the result of a previous instruction would typically stall. However as instructions are interleaved as described above from threads operating on unrelated data instances the time between potentially dependent register accesses for code running within any given execution thread is increased buy the number of active thread, as such the number of active threads is chosen such that it equals the latency of the ALU pipeline.

Figure 4:
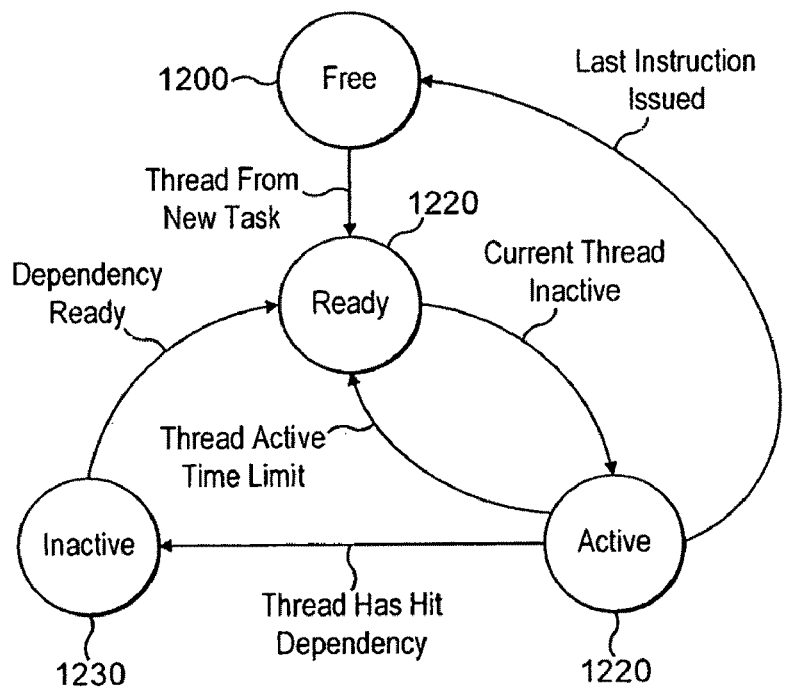
FIG. 4—illustrates thread States within Thread Manager of FIG. 3.

FIG. 4 illustrates the four possible states of a thread and the activities that cause a transition between those states. Threads start in a 'free' state at 1200 until the TCU 1024 (FIG. 3) issues data instances to run on them as previously described causing a transition to the 'Ready' state 1210. Threads remain in a ready state until the thread manager places a currently active thread into an inactive or free state, causing a ready thread to transition to 'Active' at 1220. Threads remain active until such point as they encounter a dependency that would result in a stall if they where to continue execution. When a read hits such a dependency the thread manager moves its state to 'Inactive' at 1230. It should be noted that if no other threads are in a 'Ready' state at this point the thread manager will signal the Instruction Fetch and Decode unit (IFD) 1028 of FIG. 3 to insert no-ops into the instruction stream being fed to an ALU 1034 between the IFD and the SDS. A thread remains in an 'Inactive' state until all dependencies that caused its deactivation have been satisfied at which point the thread transition back to a 'Ready' state at 1210. In order to avoid active threads from blocking execution of any 'Ready' threads for prolonged periods of time the thread manager will change an active thread back to a ready state if a thread exceeds a pre-defined active time limit. At the point an instruction is encountered that is marked as 'Last' (i.e., the last instruction) the thread manager will revert the state of the thread back to 'Free' at 1200. Execution of an instruction marked as "Last"also results in any allocated temporary or input storage being freed, although not output storage. The possible dependencies that result in the de-activation of a thread are, Code cache miss
Branch dependent on a condition code that is currently invalid
Data from an external memory read not yet returned
Attempt to aquire a semaphore that is currently owned by another thread
Waiting synchronization In order to minimise latency for selection of active threads the thread manager updates the status of inactive threads to 'ready' as soon as any outstanding dependencies complete.

The thread manager issues instruction fetches for active threads to the Instruction Fetch and Decode unit (IFD) 1028 which issues fetches to the instruction cache 1030. If an issued fetch causes a cache miss the IFD informs the thread manager of this, which will deactivate the thread as described above, until such time as the Instruction cache retrieves the required cache line. Fetched instructions are decoded and any branch or control instruction executed within the IFD. Any control or branch instruction that references a control resource (such as a condition code) that is not currently valid will result in the IFD informing the thread manager that the thread should be deactivated until such point as the control resource becomes valid. All other instructions are passed to the ALU 1034 for execution. It will be noted the ALU operates directly on the data contained within the shared data store.

Prior to completion most threads will signal an emit to the Processing Pipelines 1040 which will read required data from the output buffers allocated within the shared data store 1036. When this process is complete the processing pipeline signals that the output buffer resource has been freed.

In a preferred embodiment of the invention the system is adapted for use within a tile base rendering system.

Tile based rendering systems are known. These break down an image to be rendered into a plurality of rectangular blocks or tiles. The way in which this is done and the subsequent texturing and shading performed is shown schematically in FIG. 5. A primitive/command fetch unit 1501 fetches a stream of commands and primitive data from memory and passes it to a geometry processing unit 1502 which transforms it into screen space using a well known method. The data is then supplied to a tiling unit 1503, which inserts the screen space geometry into lists for a set of defined rectangular regions, or tiles, 1504. Each list contains primitives that exist wholly or partially in a sub-region of a screen (i.e. a tile). A list exists for exists for every tile on the screen, although it should be borne in mind that some lists may have no data in them.

The tiled data lists are fetch by a tile parameter fetch unit 1505 which feeds them tile by tile to a hidden surface removal unit (HSR) 1506 and from there to a texturing and shading unit (TSU) 1508. The HSR unit processes each primitive in the tile and passes only data for visible pixels to the TSU as described below.

The texturing and shading unit takes the dam from the HSR unit and uses it to fetch textures and apply shading to each pixel within a visible object using techniques that are well known.

The TSU then feeds the textured and shaded data to the alpha test unit 1509, fogging unit 1510 and alpha blending unit 1511 which perform alpha test, fogging and alpha blending respectively in a well known manner. Alpha blending is performed to an on chip tile buffer 1512 thereby eliminating external memory bandwidth associated with this operation. On completion of each tile the Pixel processing unit 1514 performs any backend processes such as packing or anti-alias filtering before writing the resulting data out to external memory used to store the rendered scene 1516.

Figure 6:
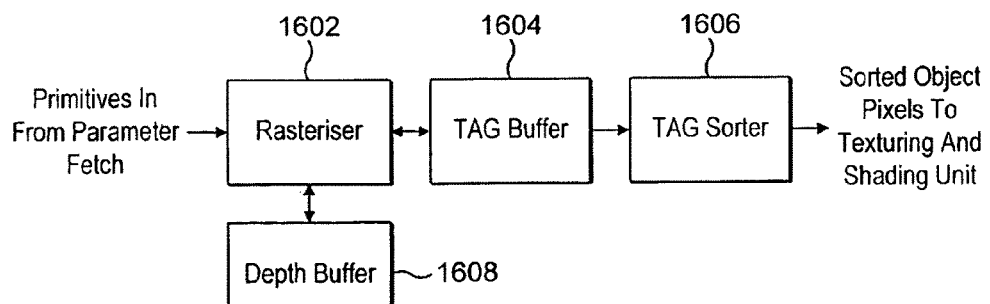
FIG. 6—illustrates a typical HSR unit within a tile based rendering system which may use an embodiment of the invention.

FIG. 6 describes the HSR unit of a typical tile based rendering device in more detail. Specifically the rasteriser 1602 tests the depths of incoming primitive pixels against the on chip tile buffer 1608, if a pixel location is found to be visible a "tag" uniquely identifying that object is written to the tag buffer 1604. The contents of the tag buffer need to be passed to the texturing and shading unit any time a pixel requires overwriting with a pixel from an object that is transparent. When this occurs the current contents of the tag buffer are passed to the Sorter 1606, which sorts and passes the contents of the tag buffer to the texturing and shading unit based on object tags such that the texturing and shading unit sees all the pixels associated with each visible object within the tile in one go. This process is referred to as pass "spawning".

Figure 7:
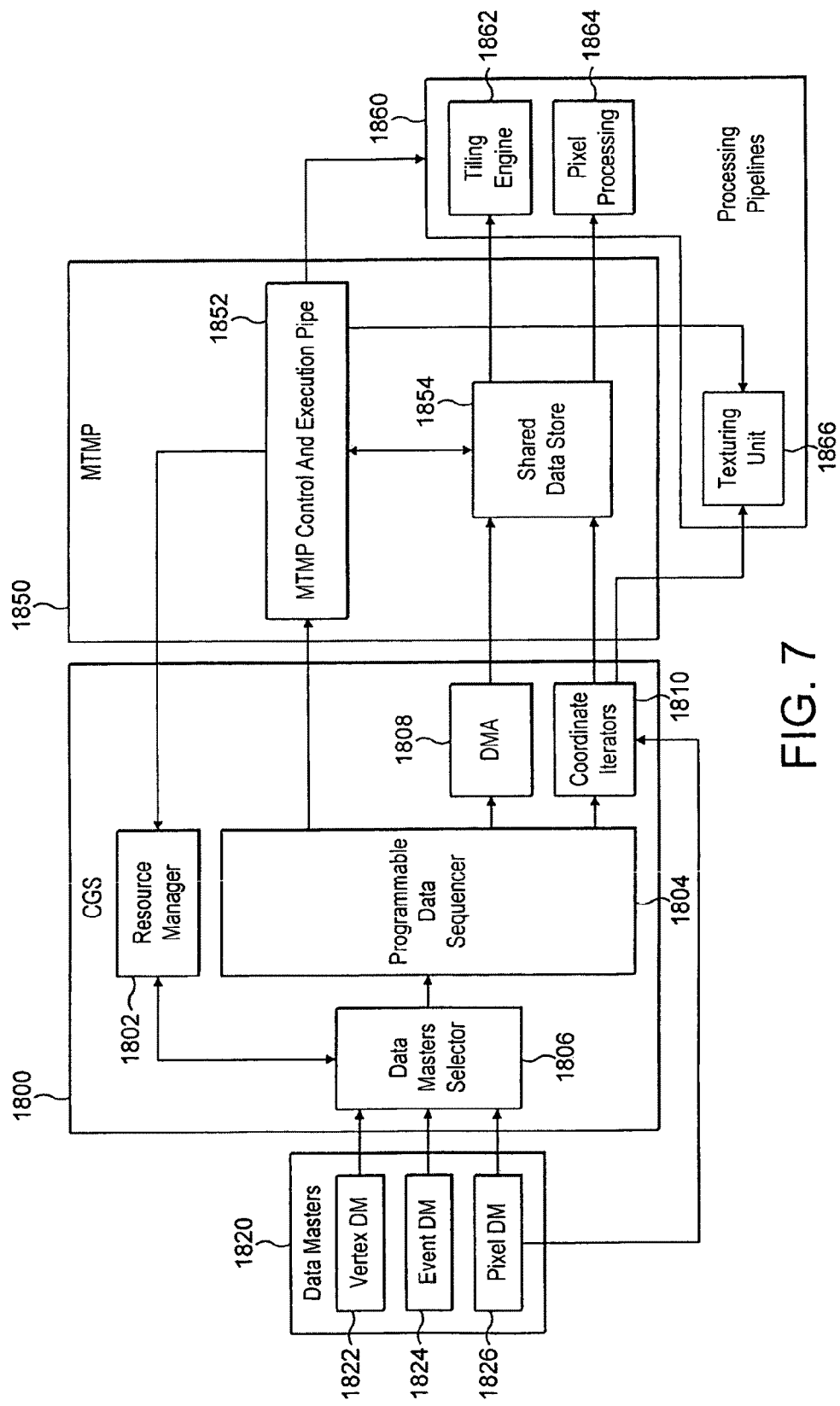
FIG. 7—illustrates a tile based rendering system implemented using an embodiment of the invention.

FIG. 7 describes the further embodiment of the invention as applied to tile based rending. For reasons of clarity the MTMP control and execution pipe 1852 encompasses the task queue 1022, task control unit 1024, thread manager 1026, thread PC 1032, instruction fetch and decode 1028 and the ALU 1034. It should also be noted that code 1030 and data 1010 caches have also been removed for reasons of clarity only.

Figure 5:
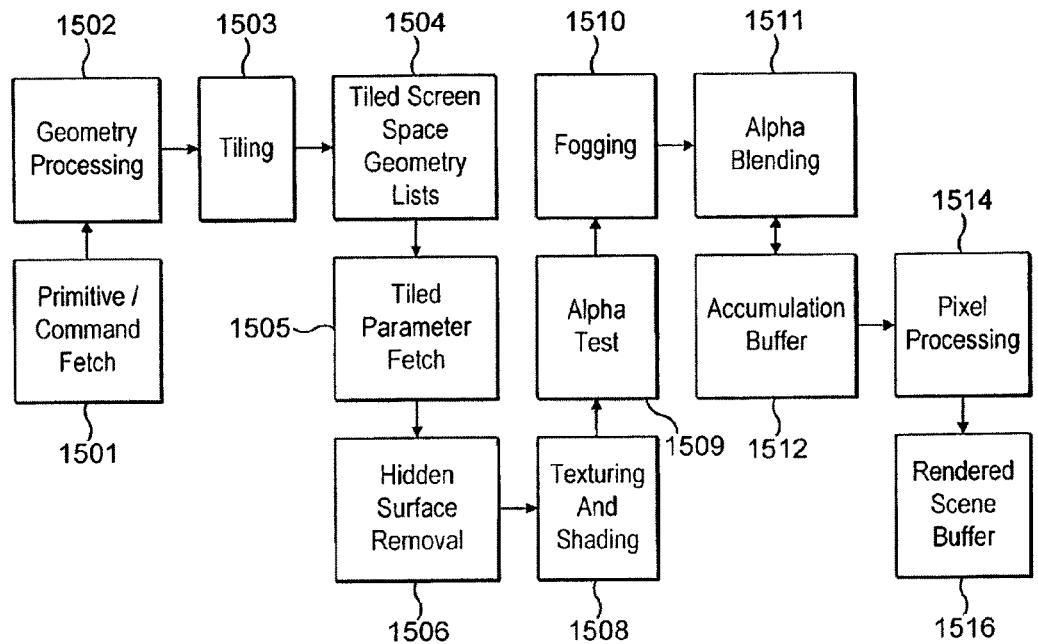
FIG. 5—illustrates a typical Tile Based Rendering System.

In this example the MTMP replaces the function of geometry processing 1502, texturing and shading 1508, alpha test 1509, fogging 1510 mad alpha blend 1511 unit from FIG. 5. In addition the accumulation buffer is replaced with output buffer space allocated from the shared data store. This integration of functionality into a single unit with general programmability results in an exceptionally capable system that may either directly emulate or replace fixed function blocks or replace them with an arbitrary piece of code supplied by an attached application.

The Data masters 1820 are now allocated specific functions as follows. The pixel data master (PDM) 1826 incorporates the functionality of tiled parameter fetch 1505 and hidden surface removal 1506 in FIG. 5. The PDM feeds pixel processing requests to the DMS 1806 in blocks of N pixels, where in this example N lies between 4 and 128, with 4 being the required minimum due to the well known manner in which pixel processing pipelines must implement rate of change calculations. Each data service request represents multiple pixels in order to minimise the overheard within the PDS 1804 when processing pixel data. It should be noted that the PDM also passes parameters required for triangle rastrisation to the coordinate iterators 1810.

The vertex data master (VDM) 1822 fetches incoming primitives from external memory and passes indices for vertices that should be fetched in each data service request. It should be noted that the VDM also directly passes sideband information to the tiling engine 1862 to enable it to correctly re-construct primitives from the processed vertices.

The event data master (EDM) 1824 is fed with events from the other data masters within the system and from the Host allowing the architecture to be used for processing system events and general commands avoiding the need to interrupt the host processor to service these events.

It should be noted that additional data masters can be added to the system, for example a data master could be implemented that takes a feed from the tiled parameter fetch unit allowing the fetched primitive data to be pre-processed before it is passed to the HSR unit (which would in effect become another processing pipeline). This pre-processing would allow for generation of procedural geometry such as high order surfaces while the tiled lists are being processed allowing for a significant reduction in consumed memory for tiled primitive lists.

The processing pipelines 1860 are also now allocated specific functions with the tiling engine 1862, the pixel processing 1864 and the texturing unit 1866 being directly equivalent to same units in FIG. 5.

The approach to data processing is a described previously with a few additional functions available. Specifically the PDS may now, for pixel data, also load data into the shared data store by way of a set of coordinate iterators 1810 or the texturing unit 1866.

Pixel processing occurs whenever the PDM's HSR unit spawns a pass which will cause it to signal the DMS that it has data to be processed. When selected the code executed on the PDS loads coordinate and texture data into the allocated area of the shared data store. Data instances within the system represent a single pixel with executed code storing the results into the allocated output buffer within the shared data store. It should be noted that each pixel data instance does not perform an emit to the pixel processing unit 1864 as the output buffer is not finalised until the entire tile has be processed. In order for the tile data to be emitted the EDM 1824 is fed by a signal from the PDM that indicates that the tile is complete. The EDM then generates a task that is used to emit the tiled data to the pixel processing it. It should be noted that the EDM can be used to generate events in this manner for many other purposes, for example a task could be emitted between passes spawned by the HSR unit allowing processing to be performed on the contents of the tile buffer between each pass. It should be noted at it is possible to perform any amount or type of processing on these events, for example when emitting the completed tile additional processing could be performed to generate levels for a mip-map (a well known technique) for the emitted data.

Vertex processing operates in a similar manner to a generic data source as described previously with an emit being performed to the tiling engine per processed vertex.

Figure 8:
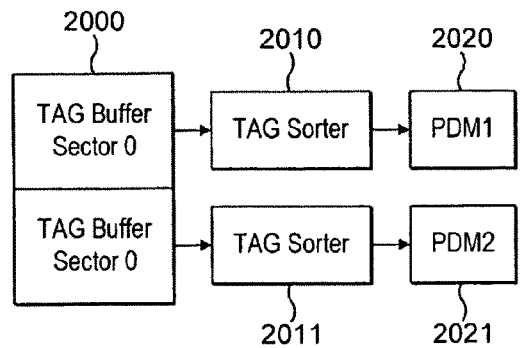
FIG. 8—illustrates tile sector to Pixel Data Master (PDM) mapping.

In a further extension to the embodiment the architecture may also be scaled. For pixel processing this is accomplished by laying down multiple media processing cores with each core mapped to a different "sector" of the tile as illustrated in FIG. 8. It will be noted that the split occurs when visible tags are transferred from the HSR unit's tag buff 2000 to the tag sorters 2010, 2011, with a tag sorter being dedicated to each PDM 2020, 2021, this maximises the level of parallelism between the two pipelines without the need to split the HSR unit at the front end.

As these different sector are non overlapping they can inherently be processed in parallel across multiple pipelines. Typically as the number of pipelines are increased the tile size is increased in proportion to the number of attached pipelines e.g. if a single pipeline is attached to an HSR unit that works on a 16×16 tile, then two pipelines would be attached to an HSR unit that works on a 32×16 tile and so on. Alternatively the size of the sectors can be reduced allowing the tile size to be kept constant, however this will result in a reduction of efficiency when processing pixel data in each pipeline.

Generally speaking the approach of scaling the tile size to match the number of pipelines can continue until the performance of the HSR unit is saturated i.e. it becomes difficult to scale its performance further. At this point scaling can be continued by laying down multiple parallel HSR units.

For vertex processing scalability can be achieved by distributing the incoming primitive data across the available pipelines. This is typically done using either a simple round robin mechanism or by sending blocks of vertices to the pipeline which is the least busy. The former mechanism is preferred as it simplifies the tiling mechanism later in the pipeline.

Figure 9:
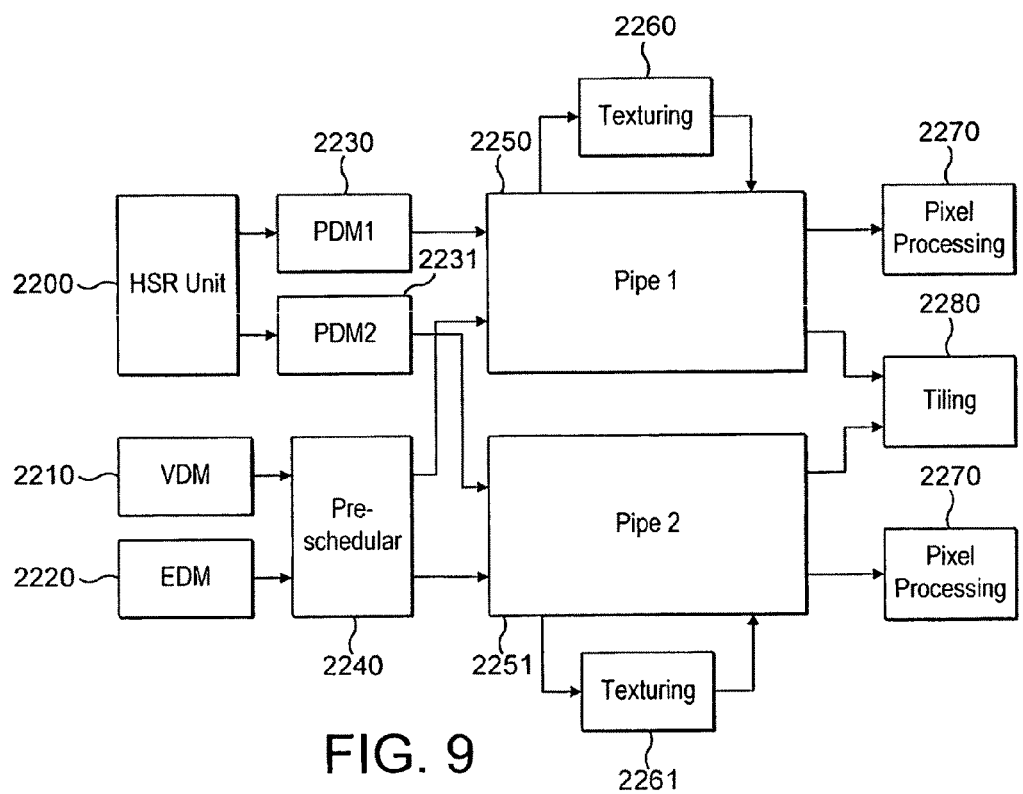
FIG. 9—illustrates a system scaled to two pipelines.

FIG. 9 illustrates the arrangement for a two pipeline system. It should be noted that sa of Pipe 1 2250 and Pipe 2 2251 represent both COS and MTMP previously described separately in order to aid clarity.

The HSR unit 2200 processes incoming tiled parameter lists as previously described. The pixel data masters 2230 and 2231 are each mapped to a different part of the HSR unit's tag buffer as described above. Each PDM is dedicated to a specific media processing core 2250, 2251. It should be noted that the texturing (2260,2261) and pixel processing (2270, 2271) pipelines arm duplicated along with the media processing core. The processed pixel data is passed from the MTMP's to the pixel processing units 2270, 2271 at the completion of a tile as previously described. The pixel processing units are duplicated along with the processing units as they have a non overlapping assignment to pixels stored in memory making them directly scalable along with the rest of the pixel processing pipeline.

The vertex data master 210 and the event data master 2220 each feed service requests into the pre-scheduler 2240. The pre- scheduler maintains a service queue per attached pipeline for each of data masters (VDM, EDM). The queues are filled in simple round robin order a processing requests are distributed evenly across the attached pipelines. Processed vertices are passed from the MTMP to the tiling unit 2280 which re-combines them with primitive data generated by the VDM before applying the tiling process as previously described.

The invention claimed is:

1. A method for processing multiple streams of data on a plurality of execution threads comprising the steps of:
   selecting data from at least one of a plurality of data sources in dependence on an availability of storage in a data storage means, wherein each data source comprises a plurality of data instances, each data instance being a quanta of data that may be processed without reference to other data in and incoming data stream, wherein each data source provides a minimum data instance count to the data selecting step, and wherein a data source is selected in dependence on the minimum data instance count;
   allocating an address in the data storage means for the selected data;
   loading the selected data into the allocated data address;
   constructing an execution task that includes an identifier of the selected data source, the data address, and a code execution address;
   queuing the execution task with other previously constructed execution tasks;
   determining which processing resources are required for each task;
   selecting tasks for execution in dependence on an availability of the processing resources;
   distributing the selected tasks for execution across a plurality of processing threads;
   determining whether any of the threads will stall due to data dependencies;
   repeatedly selecting a subset of the threads that will not stall due to said the data dependencies; and
   executing the subset of the threads.

2. The method according to claim 1, wherein the step of selecting data selects the plurality of data instances from the selected data source and provides the selected plurality of data instances to the allocating step and the loading step in order to construct the execution task.

3. The method according to claim 1, wherein the step of selecting tasks for execution selects the tasks in dependence on execution dependencies of the tasks.

4. The method according to claim 3, wherein the execution dependencies include external and internal dependencies.

5. The method according to claim 3, further including the step of blocking tasks that have the execution dependencies.

6. The method according to claim 1, wherein the distributing step comprises the step of distributing data instances from the tasks to the plurality of execution threads.

7. The method according to claim 1, further including the step of incrementing an age counter for a task each time the task is rejected for execution.

8. The method according to claim 7, further including the step of executing the task when the age counter for the task exceeds a predetermined value.

9. The method according to claim 1, wherein the loading step comprises the steps of supplying the code execution address to a programmable data sequencer and executing a code from the code execution address to cause the data to be written to the data storage means.

10. The method according to claim 9, wherein the execution of the code causes the data to be written directly from the data source to the data storage means.

11. The method according to claim 9, wherein the execution of the code causes data to be fetched from a memory and written into the data storage means.

12. The method according to claim 9, wherein the programmable data sequencer comprises a thread on a multithreaded processing means.

13. The method according to claim 9, wherein the execution of the code causes texture coordinate or other data iterated within a coordinate iterator to be written directly to the data storage means.

14. The method according to claim 9, wherein the execution of the code causes texture data to be sampled, filtered and written to the data storage means.

15. The method according to claim 1, further including the step of allocating input data storage in the data storage means each time a data source is selected.

16. The method according to claim 1, wherein the selected data source includes the plurality of data instances which share an output buffer, and an output data storage is allocated on a first of the data instances only, until the selected data source signals that the data instances sharing the output buffer have been exhausted.

17. The method according to claim 1, wherein the method is executed on a plurality of processing cores and further includes the step of allocating each processing core to a different section of a tile in a tile-based rendering system.

18. The method according to claim 17, further including the step of selecting a size of tiles in dependence on a number of available processor pipelines from the plurality of processing cores.

19. The method according to claim 18 further comprising the step of receiving vertex data and distributing the vertex data across the available processor pipelines.

20. The method according to claim 18, further comprising the step of receiving pixel data and distributing the pixel data across the available processor pipelines.

21. An apparatus for processing multiple streams of data comprising:
   a processor;
   a plurality of data sources;
   means for selecting a data source from the plurality of data sources in dependence on an availability of storage in a data storage means, wherein each data source comprises a plurality of data instances, each data instance being a quanta of data that may be processed without reference to other data in and incoming data stream, wherein each data source provides a minimum data instance count to the data selecting step, and wherein a data source is selected in dependence on the minimum data instance count;

means for allocating an address in the data storage means for the selected data source;

means for loading data for the selected data source into the allocated address for the selected data source;

means for constructing an execution task that includes an identifier of the selected data source, a code execution address and a data address;

a task queue for constructed execution tasks;

means for selecting tasks for execution in dependence on an availability of processing resources;

means for distributing the selected tasks across a plurality of execution threads;

means for determining whether any of the threads will stall due to data dependencies;

means for repeatedly selecting a subset of the threads that will not stall due to the data dependencies; and means for executing the subset of the threads.

22. The apparatus according to claim 21, wherein the means for selecting a data source selects the plurality of data instances from the data source and provides the selected plurality of data instances to the allocating means and the loading means so that the constructing means can use the selected plurality of data instances.

23. The apparatus according to claim 21, wherein the means for selecting tasks selects the tasks for execution in dependence on execution dependencies of the tasks.

24. The apparatus according to claim 23, wherein the execution dependencies include external and internal dependencies.

25. The apparatus according to claim 23, further including means for blocking tasks that have the execution dependencies.

26. The apparatus according to claim 21, wherein the distributing means comprises means for distributing data instances from the tasks to the plurality of execution threads.

27. The apparatus according to claim 21, further including means for incrementing an age counter for a task each time the task is rejected for execution.

28. The apparatus according to claim 27, wherein the executing means executes the task when the age counter for the task exceeds a predetermined value.

29. The apparatus according to claim 21, wherein the loading means comprises means for supplying the code execution address to a programmable data sequencer and means for executing a code from the code execution address to cause the data to be written to the data storage means.

30. The apparatus according to claim 29, wherein the means for executing the code causes the data to be written directly from the data source to the data storage means.

31. The apparatus according to claim 29, wherein the means for executing the code causes the data to be fetched from a memory and written into the data storage means.

32. The apparatus according to claim 29, wherein the execution of the code causes texture coordinate or other data iterated within a coordinate iteration unit to be written directly to the data storage means.

33. The apparatus according to claim 29, wherein the execution of the code causes texture data to be sampled, filtered and written into the data storage means by a texturing engine.

34. The apparatus according to claim 29, wherein the programmable data sequencer comprises a thread in a multi-threaded processor.

35. The apparatus according to claim 21, wherein the allocating means allocates the address each time a data source is selected.

36. The apparatus according to claim 21, wherein the selected data source includes the plurality of data instances which share an output buffer, and a means for allocating data storage allocates an output buffer data storage in a first of the data instances only, until the selected data source signals that the data instances sharing the output buffer have been exhausted.

37. A tile-based rendering system comprising:

a processor;

a plurality of data sources;

means for selecting a data source from the plurality of data sources in dependence on an availability of storage in a data storage means, wherein each data source comprises a plurality of data instances, each data instance being a quanta of data that may be processed without reference to other data in and incoming data stream, wherein each data source provides a minimum data instance count to the data selecting step, and wherein a data source is selected in dependence on the minimum data instance count;

means for allocating an address in the data storage means for the selected data source;

means for loading data for the selected data source into the allocated address for the selected data source;

means for constructing an execution task that includes an identifier of the selected data source, a code execution address and a data address;

a task queue for constructed execution tasks;

means for selecting tasks for execution in dependence on an availability of processing resources;

means for distributing the selected tasks across a plurality of execution threads;

means for determining whether any of the threads will stall due to data dependencies;

means for repeatedly selecting a subset of the threads that will not stall due to the data dependencies; and means for executing the subset of the threads.

38. The tile-based rendering system according to claim 37, further comprising a plurality of multithreaded processing cores, each processing core being allocated to a different section of a tile.

39. The tile-based rendering system according to claim 38, wherein a size of the tile is dependent on a number of available processor pipelines from the plurality of processing cores.

40. The tile-based rendering system according to claim 38, further including pre-scheduler means for receiving vertex data and distributing the vertex data across available processor pipelines.

41. The tile-based rendering system according to claim 38, further including a pre-scheduler means for receiving pixel data and distributing the pixel data across available processor pipelines.

* * * * *